(12) United States Patent
Lipets et al.

(10) Patent No.: US 8,554,704 B2
(45) Date of Patent: Oct. 8, 2013

(54) CRUNCHER—AN MIP SOLVER ACCELERATOR

(75) Inventors: Valdimir Lipets, Haifa (IL); Yossi Shiloach, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 12/469,691

(22) Filed: May 21, 2009

(65) Prior Publication Data

US 2010/0299291 A1 Nov. 25, 2010

(51) Int. Cl.
 *G06F 15/18* (2006.01)

(52) U.S. Cl.
 USPC .......................................................... 706/13

(58) Field of Classification Search
 None
 See application file for complete search history.

(56) References Cited

PUBLICATIONS

Bilgen, "An Iterative Fixing Variable Heuristic for Solving a Combined Blending and Distribution Planning Problem", 2007, Numberical Methods and Applications, Volumn 4310/2007, pp. 231-238.*
Glen, "Sustainable Yeild Analysis in a Multicohort Single-Species Fishery: A Mathematical Programming Approach", 1995, The Journal of the Operational Research Society, vol. 46 No. 9, pp. 1052-1062.*
Bethold, "Heuristics of the Branch-Cut-and-Price-Framework SCIP", 2008, Operations Research Proceedings, vol. 2007, pp. 31-36.*
Bixby et al., "MIP: Theory and Practice—Closing the Gap", 2000, Systems Modelling and Optimization: Methods, Theory, and Applications, pp. 31.*
B. Bilgen, "An Iterative FAn Iterative Fixing Variable Heuristic for Solving a Combined Blending and Distribution Planning Problem", Dokuz Eylül University, Department of Industrial Engineering, 35100 Izmir, Turkey.
J.J. Glen, "An iterative mixed integer programming method for classification accuracy maximizing discriminant analysis", Management School, The University of Edinburgh, Computers and Operations Research, 2001.

* cited by examiner

*Primary Examiner* — Jeffrey A Gaffin
*Assistant Examiner* — Paulinho E Smith
(74) *Attorney, Agent, or Firm* — Daniel Kligler

(57) ABSTRACT

Methods and systems are provided for solving an optimization problem using a model expressed in a mixed integer programming (MIP) language. The problem is constrained within a space of valid solutions by a plurality of MIP variables. A skeleton set of the variables are designated as eligible for fixed value assignments. An initial solution for the problem is obtained, which forms the basis for refinement. New versions of the problem are prepared and solved iteratively by fixing a proportion of the skeleton set to their best known values, as found in a previous problem-solving iteration.

16 Claims, 9 Drawing Sheets

FIG. 7 (PRIOR ART)

```
C:\WINDOWS\SYSTEM32\CMD.EXE - CPLEX                              _ □ x 19900  19655   1346.9110   513   40450.0000   41.4894   2285242   99.90%
 20000  19755   1546.3795   507   40450.0000   41.4894   2296103   99.90%
Elapsed time = 1685.66 sec. (tree size = 126.05 MB).
 20100  19855    524.1315   518   40450.0000   41.4894   2314193   99.90%
 20200  19955    526.2282   467   40450.0000   41.4894   2320218   99.90%
 20300  20055   1209.6492   518   40450.0000   41.4894   2334572   99.90%
 20400  20153   5212.9999   545   40450.0000   41.4894   2343026   99.90%
 20500  20253    575.4931   564   40450.0000   41.4894   2356044   99.90%
 20600  20353    701.3943   476   40450.0000   41.4894   2368931   99.90%
 20700  20453    496.8750   465   40450.0000   41.4894   2387900   99.90%
 20800  20553    497.9167   423   40450.0000   41.4894   2402604   99.90%
 20900  20653    619.0690   557   40450.0000   41.4894   2417700   99.90%
 21000  20753    649.9866   543   40450.0000   41.4894   2427943   99.90%
Elapsed time = 1784.94 sec. (tree size = 132.73 MB).
Nodefile size = 4.87 MB (1.78 MB after compression)
 21100  20853    701.0870   556   40450.0000   41.4894   2440944   99.90%
 21200  20953    903.1703   492   40450.0000   41.4894   2455253   99.90%

Gomory fractional cuts applied:  210

MIP - Aborted, integer feasible:  Objective =  4.0450000000e+004
Current MIP best bound = 4.1489361700e+001 (gap = 40408.5, 99.90%)
Solution time =  1817.11 sec.  Iterations = 2469810  Nodes = 21296 (21050)

CPLEX>
```

FIG. 8

```
C:\WINDOWS\SYSTEM32\CMD.EXE - CPLEX 25369.1678   163                      Cuts:      0      1621
                  25369.5913   164                   Impl Bds:     1      1622
*     0+      0                  0   463300.0000    25369.5913           1622
*    46      36                  0    29150.0000    26424.0208           2162
    100      75      28777.9295117    29150.0000    26721.4184           3306
    183     129                  0    29100.0000    26886.6864           4733
*   200     144      28486.9501  91   29100.0000    27002.5107           5039
    214     114                  0    28750.0000    27002.5107           5150
*   242     115                  0    28650.0000    27072.6436           5566
    300     145      28259.7189 119   28650.0000    27437.5240           6807
    400     183         cutoff         28650.0000    27684.8003           8922
    500     216      28518.4335 117   28650.0000    27911.9911          10601
    600     194         cutoff         28650.0000    28138.0919          11858
    700     164      28596.4452  59   28650.0000    28317.6515          12938
    800     113         cutoff         28650.0000    28449.8155          13649
*   890       4                  0    28600.0000    28590.0139          14166

Implied bound cuts applied:        227
Mixed integer rounding cuts applied:  66
Gomory fractional cuts applied:    121

MIP - Integer optimal solution: Objective = 2.8600000000e+004
Solution time =   10.27 sec.  Iterations = 14167  Nodes = 893

CPLEX>
```

```
C:\WINDOWS\SYSTEM32\CMD.EXE - CPLEX

Clique table members: 67.
MIP emphasis: balance optimality and feasibility.
Root relaxation solution time =    0.03 sec.

Nodes                                    Cuts/
    Node  Left    Objective   IInf  Best Integer    Best Node         ItCnt    Gap 0    0    17984.1857    85                    17984.1857         551   8.43%
       0    0    21700.8421    37                    Cuts:   313        767   7.51%
       0    0    21977.6038    34                    Cuts:    80        836   6.93%
*      0+   0                       24000.0000       21977.6038         836   8.43%
       0+   0    22196.9577    27   24000.0000       Impl Bds:  21      904   7.51%
*      0+   0                       23850.0000       22196.9577         904   6.93%
       0+   0    22225.3968    23   23850.0000       Impl Bds:   6      914   6.81%
       0+   0    22225.3968    21   23850.0000       Impl Bds:   8      916   6.81%
*      0+   0                       22350.0000       22225.3968         916   0.56%
*      2    1                       22300.0000       22251.0526         931   0.22%

Implied bound cuts applied:   278
Gomory fractional cuts applied:  47

MIP - Integer optimal solution:  Objective =  2.2300000000e+004
Solution time =    0.28 sec.  Iterations = 931  Nodes = 3

CPLEX> _
```

FIG. 12

| MODEL PACK WITH CRUNCHER | | | | | | |
|---|---|---|---|---|---|---|
| Equations | Cruncher | About | | | | |
| Trace | Results | Settings | Control | | | |
| Method | Status | Value | ReleaseFrac | Improved | Elapsed | Timer |
| InitWithSol | Optimal | 0.0 | | | | |
| FixToZero | AbortTimeLim | 726.0 | 0.5 | Yes | 43.0 | 34.0 |
| FixToZero | AbortTimeLim | 718.0 | 0.5 | Yes | 77.0 | 34.0 |
| FixToZero | AbortTimeLim | 630.0 | 0.5 | Yes | 112.0 | 34.0 |
| FixToZero | AbortTimeLim | 621.0 | 0.5 | Yes | 146.0 | 34.0 |
| FixToZero | AbortTimeLim | 619.0 | 0.5 | No | 181.0 | 34.0 |
| FixToZero | AbortTimeLim | 611.0 | 0.46 | Yes | 215.0 | 34.0 |
| FixToZero | AbortTimeLim | 611.0 | 0.46 | No | 250.0 | 34.0 |
| FixToZero | Optimal | 568.0 | 0.42000002 | Yes | 263.0 | 18.0 |
| FixToZero | Optimal | 555.0 | 0.42000002 | Yes | 298.0 | 30.0 |
| FixToZero | AbortTimeLim | 555.0 | 0.42000002 | No | 333.0 | 34.0 |
| FixToZero | Optimal | 536.0 | 0.38000003 | Yes | 339.0 | 6.0 |
| FixToZero | Optimal | 536.0 | 0.38000003 | No | 346.0 | 6.0 |
| FixToZero | Optimal | 536.0 | 0.42000002 | No | 352.0 | 6.0 |
| FixToZero | Optimal | 536.0 | 0.46 | No | 359.0 | 6.0 |
| FixToZero | Optimal | 533.0 | 0.5 | No | 365.0 | 6.0 |
| FixToZero | Optimal | 528.0 | 0.54 | Yes | 379.0 | 14.0 |
| FixToZero | AbortTimeLim | 527.0 | 0.54 | No | 414.0 | 34.0 |
| FixToZero | AbortTimeLim | 525.0 | 0.5 | No | 448.0 | 34.0 |
| FixToZero | Optimal | 522.0 | 0.46 | Yes | 455.0 | 6.0 |
| FixToZero | Optimal | 522.0 | 0.46 | No | 465.0 | 10.0 |
| FixToZero | AbortTimeLim | 519.0 | 0.5 | Yes | 499.0 | 34.0 |
| FixToZero | Optimal | 519.0 | 0.5 | No | 506.0 | 6.0 |
| Done | Stopped | | | | | |

FIG. 13

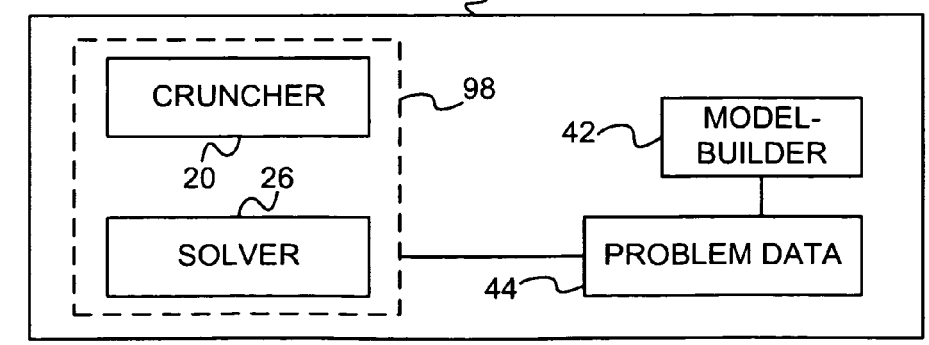

CRUNCHER—AN MIP SOLVER ACCELERATOR

BACKGROUND OF THE INVENTION

1. Field of the Invention

This invention relates to improvements in optimization techniques using mixed integer programming (MIP).

2. Description of the Related Art

Optimization methods are used in a variety of applications for determining the optimal solution of a practical problem. Applications of optimization methods include, for example, worker shift planning, flow problems, packaging problems, time-table optimization, resource allocation, financial optimization problems and many others. In a typical optimization task, the problem is expressed using a set of constraints defined over variables, and an objective function defined over a subset of the variables. The optimization process seeks a solution that satisfies the constraints, while maximizing or minimizing the objective function.

Linear programming is a technique for optimization of a linear objective function, subject to linear equality and linear inequality constraints. Mixed integer programming (MIP) is a specialization of linear programming, in which a portion of the variables are required to be integers. It is a well established method for combinatorial optimization. The problem solving process typically involves two steps: modeling and mathematical solving. In the modeling phase, a problem is trans-lated from its natural language description into an MIP language formulation of variables, linear constraints over those variables and an objective function for which an extremum is to be found. The solving phase is the process of getting a best solution to the MIP format of the problem. Several good MIP solving tools (called 'solvers') are available, such as CPLEX® and the COIN-OR (COmputational INfrastructure for Operations Research) open source project. However, as good as these solvers are—one often encounters problems that take considerable time to solve or fail to converge to an acceptable solution.

For example, the document *An Iterative Fixing Variable Heuristic for Solving a Combined Blending and Distribution Planning Problem*, Bilge Bilgen, in T. Boyanov et al. (Eds.): NMA 2006, LNCS 4310, pp. 231-238, (2007), describes a mixed integer programming (MIP) model in which a heuristic solution is used to deal with problems having large numbers of variables. This involves an iterative rounding technique in which a variable with highest fractional value is rounded to the nearest integer. While this approach conserves computational effort, the authors concede that their approach yields results that are not very close to optimality for larger problems.

BRIEF SUMMARY

An embodiment of the invention provides an optimization method for problem solving including that is carried out using a processor and a memory in which computer program instructions are stored, wherein the instructions comprise distinct software modules. The software modules include a cruncher module and a solver module. The processor is operative under control of the instructions for accepting a model of a problem to be solved, wherein the model is formatted in a mixed integer programming language and is constrained within a space of valid solutions by a plurality of variables, at least some of which are integer variables.

The method is further carried out by using the cruncher module to accept a definition of an objective function for evaluating a solution of the problem, generate an initial solution for the problem, and designate a set of the integer variables as skeleton variables that are eligible for fixed value assignments. The cruncher module is operative for iteratively selecting a subset of the skeleton variables, constraining the space of the valid solutions to a non-empty subspace of the valid solutions by assigning fixed values to members of the subset according to respective values thereof that were determined in a previous solution of the problem, to thereby define a new version of the problem, and submitting the new version of the problem to the solver module.

The solver module is operative for automatically solving the new version of the problem by finding values of the variables that most closely correspond to an extremum of an objective function within the subspace of the valid solutions, and thereafter reporting an optimum solution to the problem.

Other embodiments of the invention provide computer software product and apparatus for carrying out the above-described method. Still other embodiments of the invention provide techniques for configuring a computer software product for carrying out the above-described method cooperatively with computer apparatus.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein:

FIG. 7 is a screen display illustrating a monitor output of the operation of a commercial solver applied to a class assignments problem, in accordance with the prior art;

FIG. 8 is a screen display illustrating a monitor output of the operation of the commercial solver when applied to the class assignments problem of FIG. 7, in accordance with a disclosed embodiment of the invention in one mode of operation;

FIG. 9 is a screen display illustrating a monitor output of the operation of the commercial solver when applied to the class assignments problem of FIG. 7, in accordance with a disclosed embodiment of the invention in another mode of operation;

FIG. 12 is a table showing the output of a typical session of the system shown in FIG. 1; and FIG. 13 is a detailed block diagram of the program and data objects that are incorporated in the memory of the system of FIG. 1, in accordance with an alternate embodiment of the invention.

DETAILED DESCRIPTION

In the following description, numerous specific details are set forth in order to provide a thorough understanding of the various principles of the present invention. It will be apparent to one skilled in the art, however, that not all these details are necessarily always needed for practicing the present invention. In this instance, details of computer program instructions for conventional algorithms and processes have not been shown in detail in order not to obscure the general concepts unnecessarily.

Overview.

Embodiments of the invention provide a software tool, referred to herein as the "Cruncher", which interacts with commercial MIP solvers and significantly reduces the time required to arrive at an optimum or near-optimum problem solution. It has a generic application to many types of difficult problems, regardless of the domain and the MIP modeling approach. The Cruncher can be adapted to virtually any MIP solver.

When solvers are applied to many MIP formulations of optimization problems, they tend to run for a very long time without converging to a satisfactory solution. With the aid of the Cruncher, however, convergence to a satisfactory solution almost always occurs within practical run times of an MIP solver.

Aspects of the invention increase the computational efficiency in solving an optimization problem by iteratively fixing random sets of variables, so that each iteration deals with a problem having a smaller search space than the original one. The exponential nature of an MIP search for an optimal solution causes this iterative method to converge much faster than a straightforward search.

System Architecture.

Figure 1:
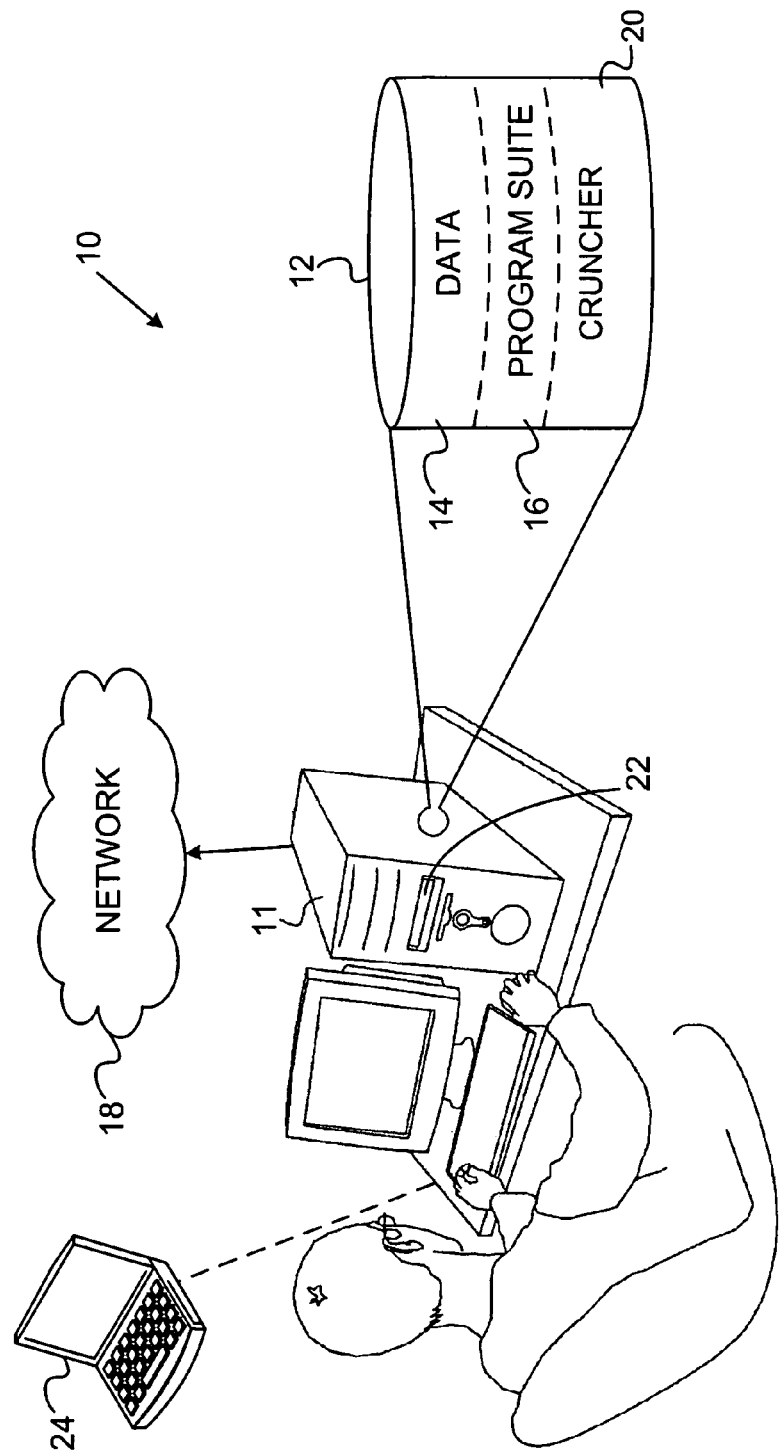
FIG. 1 is a schematic illustration of a system for solving mathematical problems involving combinatorial optimization, which is constructed and operative in accordance with a disclosed embodiment of the invention.

Turning now to the drawings, reference is initially made to FIG. 1, which is a schematic illustration of a system 10 for solving mathematical problems involving combinatorial optimization, which is constructed and operative in accordance with a disclosed embodiment of the invention.

The system 10 comprises a processor 11 and a memory 12 that stores data objects 14, including a model of the problem being solved. The processor 11 is programmed with a suitable suite of programs 16 for carrying out the functions described hereinbelow. Thus, although portions of the system 10 may be shown as comprising a number of separate functional blocks, these blocks are not necessarily separate physical entities, but rather represent different computing tasks or data objects stored in memory 12 that is accessible to the processor 11. These tasks may be carried out in software running on a single processor, or on multiple processors. The software may be provided to the processor or processors on tangible media, such as CD-ROM or non-volatile memory. Alternatively or additionally, the system 10 may comprise a digital signal processor or hardwired logic.

Although the memory 12 is shown in FIG. 1 as a local data store of the processor 11, the memory 12 may also be maintained at a site remote from the processor 11, for example, on a server or shared disk system (not shown), and accessed by the processor 11 via a network 18. In particular, the memory 12 stores a specialized module, referred to herein as cruncher 20, which the processor 11 is programmed to access and execute. In many environments the processor 11 is linked to other processors and databases via the network 18. However, this is not essential, and the system 10 may be realized as a stand-alone device. The system 10 includes one or more devices 22 for producing a software product, including the programs and objects stored in the memory 12 on a computer-readable medium, for example a CD or DVD writer. Devices employing many other technologies are also suitable for use as the devices 22, for example, writers adapted to tapes, hard disc drives, RAM, ROM, flash memory devices, floppy drives, programmable read-only memory (PROM), erasable programmable read-only memory (EPROM), and magneto-optical discs. In all of these technologies patterns or transitions in the physical state of the medium are formed therein. These patterns and sequences of transitions encode instructions or data, e.g., binary numbers that are acceptable to the processor. The nature of the state transitions varies with the particular medium, and includes changes in magnetic domains in magnetic media, formation of pits or bumps on an optical disk, etc. Once the transitions are established, the medium may be transferred to another computing device 24, which is capable of reading the medium, recognizing the transitions, and decoding them to identify executable instructions or data.

Figure 2:
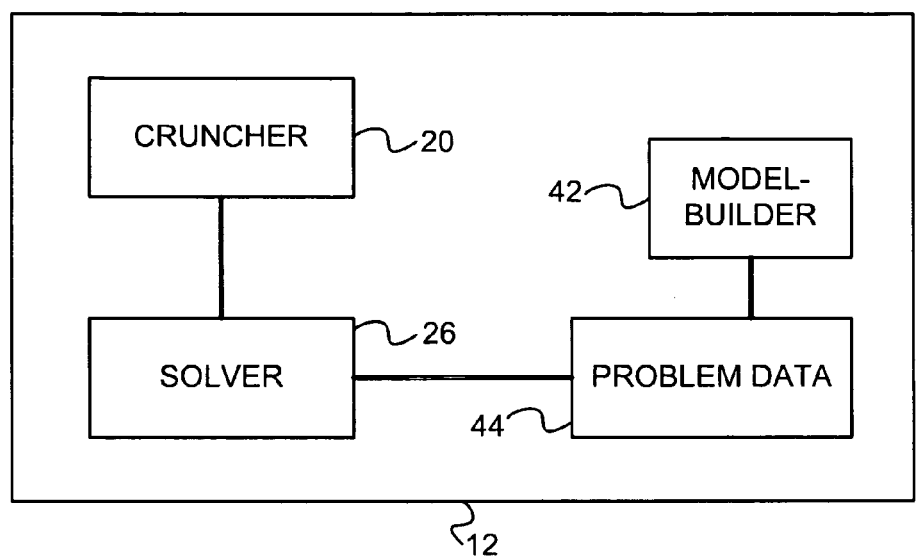
FIG. 2 is a detailed block diagram of program and data objects that are incorporated in the memory of the system of FIG. 1, in accordance with a disclosed embodiment of the invention.

Reference is now made to FIG. 2, which is a detailed block diagram of the program and data objects that are stored in the memory 12 of the system 10 (FIG. 1), in accordance with a disclosed embodiment of the invention. The cruncher 20 is a software tool, which interacts with a solver 26. The solver 26 may be any of the above-noted solvers. Indeed, the cruncher 20 can be adapted to cooperate with virtually any publically available solver.

Figure 3:
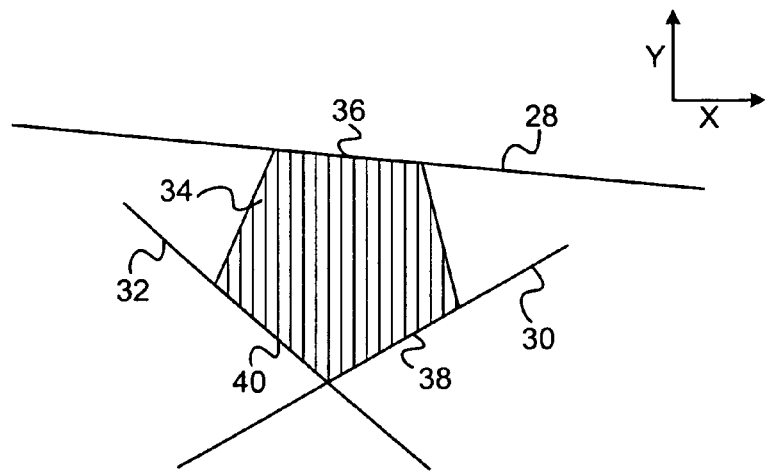
FIG. 3 is a graph showing optimal solutions for three exemplary linear objective functions that would be produced by the solver shown in FIG. 1, in accordance with a disclosed embodiment of the invention.

The action of the solver 26 can be understood by a simple graphical example. Reference is now made to FIG. 3, which is a graph showing optimal solutions for three exemplary linear objective functions 28, 30, 32. Given a linear objective function of the form aX+bY+c, the task of finding a valid solution that optimizes (maximizes or minimizes) the objective function can be viewed as finding a line of the form aX+bY (i.e., a line having a slope of −a/b) that is tangent to a polygonal solution space 34. The tangent at which the line meets the boundary of the solution space 34 corresponds to optimal solutions. In FIG. 3, the solutions that optimize functions 28, 30, 32 correspond to line segments 36, 38, 40, respectively.

Reverting to FIG. 2, the cruncher 20 cooperates with the solver 26, iteratively submitting new, versions of the problem to the solver 26. This improves the speed of computation significantly and largely eliminates failure of solutions to converge. The cruncher 20 is generic in that it is applicable to a large spectrum of difficult problems, regardless of the domain, the approach to mixed integer programming modeling, or the principles employed by the solver 26. Model-building is mostly a task performed by humans, and is a well-known process. The details of modeling a problem are not further discussed herein, as they are outside the scope of the present invention. However, in some applications model-building may be computer-assisted using a model-building module 42 to set up and model the problem interactively. The modeling tool OPL Studio, available from ILOG, Inc., 1195 West Fremont Ave., Sunnyvale, Calif. 94087-3832 is suitable for use as the model-building module 42. In any case, the model becomes a part of problem data 44. The model sets out variables that describe the problem, defines a space of valid solutions, and constructs an objective function to evaluate the solutions.

The Cruncher.

The problem-solving approach taken in the cruncher 20 is iterative, in which each iteration provides a tentative solution. Based on the tentative solution, a new version of the problem is generated. The new version is similar to the version of the previous iteration, but with different constraints. The constraints are imposed by fixing values of a subset of variables to values they possessed in the solution of the previous iteration. This subset is determined at random with a certain probability that may be adjusted at each iteration. This approach has two advantages:

1. The solver generates a solution relatively quickly, as the additional constraints reduce the size of the search space.

2. The solution generated in the succeeding iteration is guaranteed to be at least not worse than that of the previous iteration.

Basic Concepts

Skeleton Variables.

The variables of MIP optimization problems are usually include "skeleton variables", a pool or subset of integer variables that encapsulates the problem to be solved, i.e., they are "decision variables", to be contrasted with penalty variables and auxiliary variables that are often present in MIP models. Assigning values to all the skeleton variables forces an immediate unique solution, but not necessarily an optimal one.

The identity of the skeleton variables is provided by the model designer, either manually or interactively with a human operator, using the model-building module 42.

Auxiliary variables and the penalty variables can both be computed from the skeleton variables. The penalty variables in most cases are not required to be integers. Assigning fixed values to a subset of the skeleton variables essentially transforms them into constants for the next iteration and thus decreases the solution time of that iteration. Only skeleton variables participate in variable fixing.

As noted above, skeleton variables are normally designated by the model designer. However, if for some reason the skeleton variables were unspecified, it is recommended to assign all the integer variables as skeleton variables.

Skeleton Rows.

Operating the cruncher 20 requires generating some initial solution to the problem being solved. Skeleton rows are an optional subset of the set of problem constraints. This subset has the property that any feasible solution satisfying this subset is a feasible solution to the entire problem. Skeleton rows can be very helpful in finding a good initial solution quickly. They have no role other than in finding an initial solution, and normally come into play only if there are difficulties in finding an initial solution by other means. The identity of the skeleton rows is provided by the model designer.

Fixing Mode.

It will be recalled that different constraints in successive problem-solving iterations of the cruncher 20 are imposed by fixing the values of a portion of the skeleton variables. There are three variable-fixing modes: "fix-to-zero", "fix-to-value", and "fix-to-any". In the fix-to-zero mode, only a subset of those skeleton variables that were assigned a value of zero in the previous iteration are fixed to a zero value. In the fix-to-value mode only a subset of those skeleton variables that were assigned a non-zero value in the previous iteration are fixed to their previously assigned non-zero value. In the fix-to-any mode, a subset comprising any of the skeleton variables can be fixed to their previously assigned values, regardless of whether they were assigned a zero or non-zero value in the previous iteration. The subsets are randomly chosen in all three cases with a probability of selection referred to as the fixing fraction, as explained in further detail below.

The cruncher 20 can be configured by a setup file to determine which fixing mode to use at any stage of the problem solving process, and when to switch from one fixing mode to another.

Fixing Fraction.

The term "fixing fraction", a number between 0 and 1, refers to the proportion of variables subject to fixing, using one of the above-noted fixing modes, and thus determines the number of skeleton variables whose values are to be fixed. For instance, if the fixing fraction is 0.5, then only half of the skeleton variables that are eligible according to the current fixing mode will be fixed to their previously assigned values in the next iteration. The rest remain free. It is clear that as the fixing fraction decreases, the search space increases.

While there are many ways to decide which of the eligible skeleton variables are to be fixed in the next iteration, in a current embodiment they are identified randomly, each eligible skeleton variable having a selection probability that is set by the fixing fraction currently in effect. This approach does not require any insight into the problem currently being solved.

Current Objective Value.

The 'current objective value' is the value of the objective function in the current best solution. In the solving process, the solver stores the best solution found so far. When a better solution is found it replaces the current best solution.

Current Lower Bound.

The lower bound is an important concept in the solving process. It is a number that gives a lower bound to the objective function, asserting that any acceptable solution will have an objective value at least good as the lower bound. As the solving process proceeds, the lower bound increases. If the lower bound and the current objective value coincide, then an optimal solution is reached. The 'current lower bound' is the highest lower bound found so far. The term "lower bound" is used arbitrarily with respect to a desired minimum value of the objective function. It will be understood that it applies, mutatis mutandis, to relate observed values of an objective function to a desired extremum of the objective function, whether a maximum or a minimum value. This term has no other implication for the actual configuration of the objective function.

Iteration Performance Parameters.

The cruncher 20 readjusts the fixing mode, the fixing fraction and termination conditions using the following iteration performance parameters:

Previous Fixing Fraction: The fixing fraction that was used in the previous iteration. This parameter is used to determine the fixing fraction in the next iteration.

Current Fixing Fraction: This is the fixing fraction currently in effect. It is used to set a time limit to the current iteration.

Initial Objective Value: The value of the objective function at the beginning of the current iteration. This parameter is used to measure a current improvement.

Current Objective Value: The best objective value obtained during the current iteration. This parameter is also used to measure the current improvement.

Current Iteration Time: The elapsed time since the iteration started. This parameter is used to determine whether the iteration time limit has expired.

Number of Iterations without Improvement: This parameter is used to as a termination criterion for the current session. Session control parameters are described below.

Current Improvement: This is equal to the Current Objective Value–Initial Objective Value. It is used to determine whether to terminate the session, as explained in the section below entitled Session Control Parameters.

Current Termination Status. This parameter has three values: "time limit has been reached", "substantial improvement has been reached" or "an optimum solution was achieved for the current iteration". The latter is not necessarily a global optimum.

All the above-described iteration performance parameters are analyzed at run time. This analysis is used to determine the following iteration control parameters, which may vary from one iteration to another.

Iteration Control Parameters.

Iteration Time limit: A time limit imposed on the solver that causes the solver to terminate its operation and report its current solution. The time limit is set by the fixing fraction. As the fixing fraction decreases, the search space becomes larger. The time limit is accordingly increased in order that the solver can appropriately explore the enlarged search space.

Fixing mode: This parameter has been described above in the section entitled Fixing mode.

Fixing fraction: This parameter has been described above in the section entitled Fixing mode.

Premature termination. Premature Termination refers to a parameter, that when set, causes the session to terminate prior to exceeding a global time limit. The parameter global time limit is described below in the section entitled Session Control Parameters.

Session Control Parameters.

A session refers to the operation of the cruncher 20 from the time it is invoked until it halts.

Global Time Limit: A time limit, which, when exceeded, causes a session of the cruncher 20 to terminate.

First Attempt Time: A time limit for achieving an initial solution. (Typical Value: 300 sec.) When this limit is exceeded, and an initial solution has not been found, an error message may be reported and the session terminates.

Use of skeleton rows: (Yes/No) (Typical value: "No". "Yes" is used only in case of difficulties in achieving a first feasible solution).

Improvement threshold (percent): An improvement in the objective function of less than this threshold is considered as no improvement. (Typical value 0.1 percent).

Termination improvement threshold: If this threshold is exceeded during a current iteration gained such an improvement, the current iteration should terminate immediately. (Typical value 10%).

Initial fixing fraction (fix-to-zero mode) (Typical value 0.5).

Initial fixing fraction (fix-to-any mode) (Typical value 0.4).

Initial fixing fraction (fix-to-value mode) (Typical value 0.3).

Fixing fraction step-up: An increment for the fixing fraction (explained below) (Typical value 0.02).

Fixing fraction step-down: A decrement for varying the fixing fraction (explained below) (Typical value 0.04).

Initial time limit in fix-to-zero mode. When fix-to-zero mode is in effect, exceeding this time limit causes termination of an iteration. This applies in like manner to the following two initial time limits.

Initial time limit in fix-to-value mode.

Initial time limit in fix-to-any mode.

The initial fixing fraction establishes a base that is adjusted in each iteration as follows:

Current time limit=Initial time limit (fixing-mode)*Initial fixing fraction/Current fixing fraction.

Number of successive non improvements trials per each fixing mode. (Typical values: 5 for fix-to-zero mode, 20 for fix-to-any mode; 30 for fix-to-any). This parameter may be used as a session termination criterion, alone or in conjunction with other session control parameters.

The iteration control parameters and the session control parameters are kept in a setup file (ProblemName.set).

Monitor.

A monitor process of the cruncher 20 is a heuristic process that performs two tasks: (1) it readjusts the above-described control parameters from one iteration of cruncher 20 to the next; and (2) it determines that termination criteria for the solver have been met during an iteration The monitor can be implemented in many ways known to the art. The monitor is currently implemented as a Java program that uses API's provided by Cplex.

Operation.

In the discussion that follows, it is assumed that a model has previously been prepared for the problem, optionally with the assistance of the model-building module 42, and the cruncher 20 has been configured by setting its basic parameters: the fixing mode; and the fixing fraction. In many problems it is necessary to initially generate and process signals to determine physical conditions of a subject of the problem, constraints, and in some case establish initial values of parameters and incorporate data of the physical conditions, constraints, and parameter values in the model.

A set of skeleton variables will have been selected by the model builder. A set of linear constraints and an objective function to evaluate solutions within a space of valid solutions are defined. Termination conditions for an iteration and the session itself are specified in order to configure the cruncher 20, for example a time limit, achievement of an optimal value, near-optimum value, or a predefined improvement in the objective function.

Figure 4:
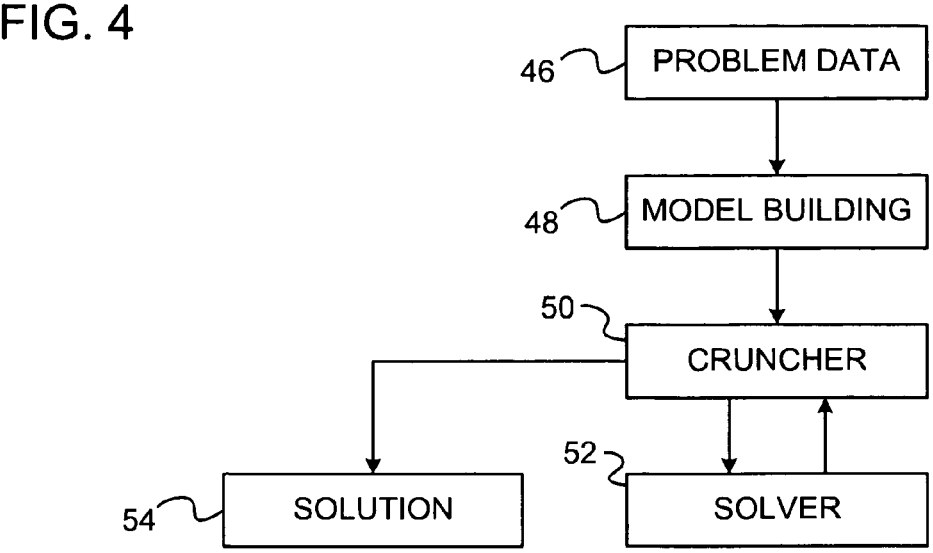
FIG. 4 is a flow chart illustrating the general operation of the programs shown in FIG. 1 and FIG. 2, in accordance with a disclosed embodiment of the invention.

Reference is now made to FIG. 4, which is a flow chart illustrating the general operation of the programs 16 (FIG. 1) as detailed in FIG. 2, in accordance with a disclosed embodiment of the invention. At initial step 46, data relating to a problem for which an optimal solution is being sought is organized. Next, at step 48, a model of the problem is built, optionally with the aid of the model-building module 42 (FIG. 2).

The model is submitted to the cruncher 20 (FIG. 2) in step 50. The cruncher 20 iteratively prepares versions of the problem in which different sets of variables are fixed.

In step 52, the versions of the problems are input to the solver 26 (FIG. 2), which returns a best solution for each particular version. The best solution becomes the basis for preparation of a new version of the problem by the cruncher 20.

When a global session termination condition has been reached, the best solution found is reported in final step 54.

Single Iteration.

Figure 5:
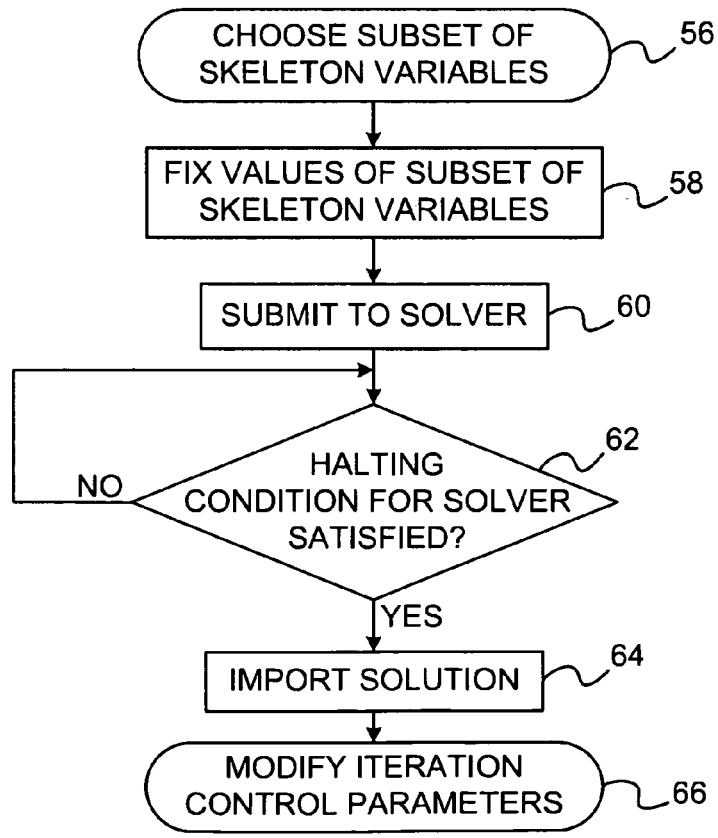
FIG. 5 is a detailed flow chart of the details of a single iteration of the operation shown in FIG. 4, in accordance with a disclosed embodiment of the invention.

Reference is now made to FIG. 5, which is a detailed flow chart of the details of a single iteration of the process described with respect to FIG. 4, in accordance with a disclosed embodiment of the invention. It is assumed that at least one iteration has preceded the current iteration, or at least an initial solution to the problem is available to treat as the previous iteration. At initial step 56 a set of skeleton variables is chosen to for value assignment, using the fixing mode and fixing fraction currently in effect.

Next, at step 58, a version of the problem is generated, and constrained by fixing the values of the set of skeleton variables chosen in initial step 56 to the values they assumed in the previous iteration.

Next, at step 60, the current version of the problem is submitted to the solver.

Next, at delay step 62, the solver executes until a halting condition is satisfied. The halting condition may be, e.g., a large improvement, no improvement within a predetermined time limit, solver halting with sub-problem optimum, i.e., The solver finds an optimal solution to the reduced problem in which some of the variables are fixed, and therefore no further improvement can be achieved in the current iteration.

When the solver has halted, if an improved solution exists, it is imported as the current best available solution at step 64 and used as a basis of variable fixing in subsequent iterations (until a better solution is found).

Next, at final step 66 the monitor process is executed to set new values for the iteration control parameters based on the performance parameters reported in the current iteration. For example, rules for adjusting the fixing fraction are shown in Table 1.

TABLE 1

| Iteration Result | Action |
| --- | --- |
| Improvement achieved | Keep the current value |
| No improvement achieved but optimality achieved | Decrease value by StepDown |
| No improvement achieved and time limit reached | Increase value by StepUp |

Some solvers have the ability to store the endstate of the optimization process in a file. This file can be read in at the beginning of the next iteration and thereby shorten the computation time significantly. This shortcut has been used in the current embodiment to solve the benchmark problems described below.

Initialization.

A cruncher session must start with an initial solution. There are several ways to generate an initial solution for the cruncher to work with:

1. Calling the solver on the original problem until some solution is found. This usually works.

2. Removing the objective function in the first iteration.

3. Solving a reduced problem by using only the skeleton rows first.

4. Padding each equation with slack variables. This allows all the skeleton variables to be set to zero, yet and obtain a feasible solution of the modified problem, even though it may not be a feasible solution to the original problem. In subsequent cruncher iterations, the slack variables will tend to disappear one-by-one until a feasible solution is found to the original problem.

Figure 6:
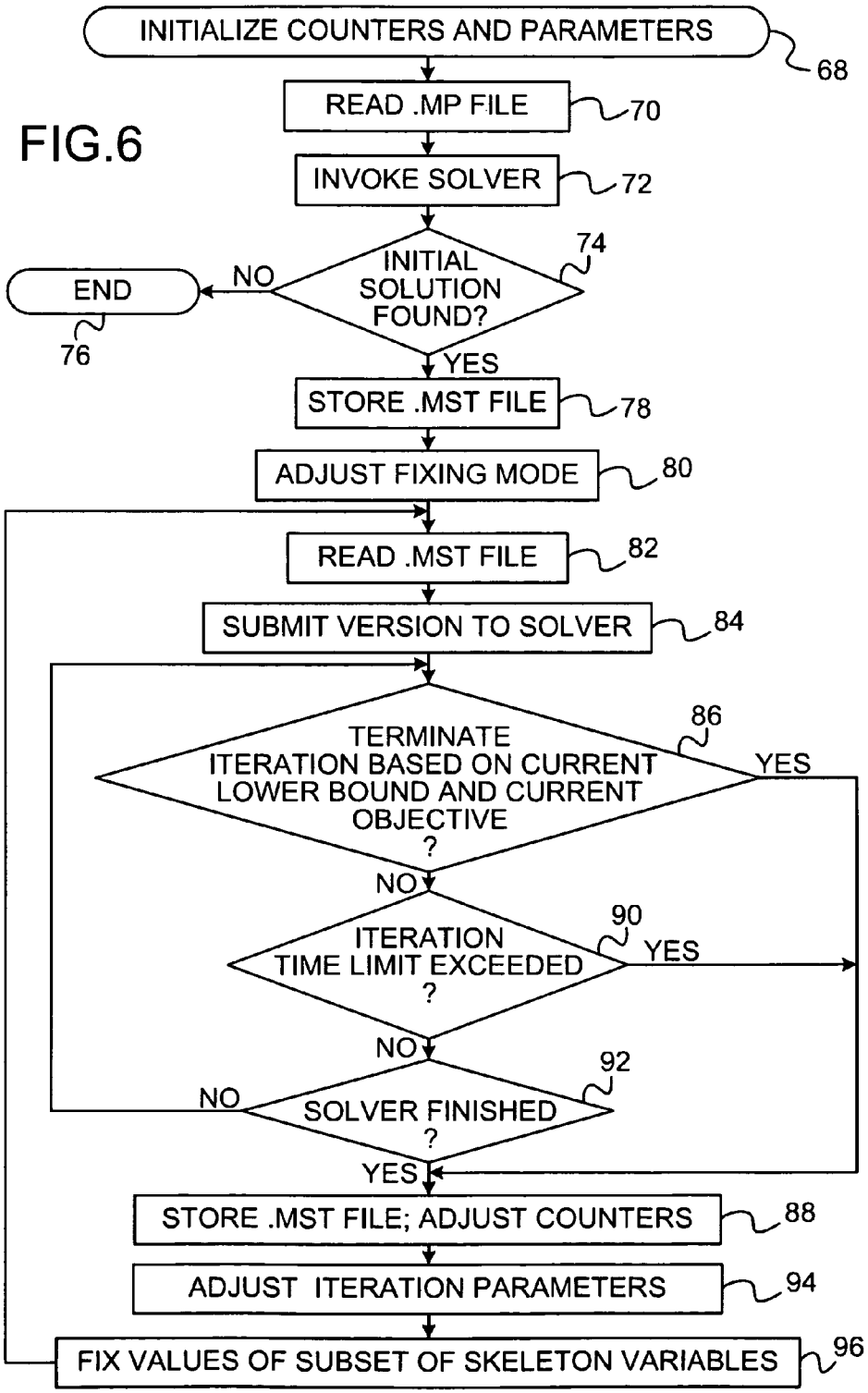
FIG. 6 is a detailed flow chart illustrating the operation of a cruncher module in the programs shown in FIG. 2, in accordance with a disclosed embodiment of the invention.

Reference is now made to FIG. 6, which is a more detailed flow chart illustrating the operation of the cruncher 20 (FIG. 2), in accordance with a disclosed embodiment of the invention. At initial step 68 parameters are initialized, in particular the counters relating to the session control parameter "number of successive non improvements trials" are set to zero for all fixing modes, respectively.

Next, at step 70, the problem's model file (.mp file) is read in. This file comprises a table of skeleton variables and skeleton rows. If the parameter "Use of skeleton rows" has the value "yes", then all rows that are not skeleton rows are marked to be disregarded in the determination of an initial solution.

Next, at step 72 the solver, currently the Cplex solver, is invoked. The time limit parameter "First Attempt Time" is imposed during this invocation.

Control now proceeds to decision step 74, where it is determined if the solver returned an initial solution. If the determination at decision step 74 is negative, then control proceeds to final step 76. An error "First solution not found" is reported, and the procedure ends.

If the determination at decision step 74 is affirmative, then control proceeds to step 78. The initial solution is stored in a file (.mst file).

Iteration of the cruncher 20 now begins. First, at step 80 decisions are made regarding modification of the fixing mode. Counters for number of successive non improvements trials are evaluated, and the fixing mode adjusted in accordance with the algorithm shown in the pseudocode of Listing 1:

Listing 1

If counter (fix-to-0) of number of successive non-improvement < maximum number of successive non-improvement trials ("fix-to-0") then fixing mode = fix-to-0
elseif counter (fix-to-any) of number of successive non-improvement < maximum number of successive non-improvement trials (fix-to-any) then fixing mode = fix-to-any
else fixing mode = fix-to-value Next, at step 82 the last stored .mst file is read in.

Next, at step 84 the version of the problem represented by the .mst file read in at step 82 is submitted to the solver.

The following steps deal with iteration control of the solver, and are shown in a linear sequence for clarity of presentation. However in an efficient implementation of the cruncher 20, they need not be performed in the manner shown, but could be performed in different orders or concurrently, for example as a multi-threaded process, different processes, or implemented as events.

At decision step 86, the performance parameters "Current Lower Bound" and "Current Objective", which are provided by the solver at run time are evaluated using the algorithm expressed in the pseudocode of Listing 2. This step may be performed repeatedly as the solver executes, in order to determine whether to terminate the current iteration.

If not terminated, then control returns to decision step 86.

Listing 2

If Current objective <=
    (Initial objective + Current lower bound) / 2 then
terminate the iteration due to substantial improvement.
Else continue to monitor Cplex.

If, at decision step 86, the iteration is terminated, the method continues at step 88. Otherwise, a determination if the iteration time limit has been exceeded at decision step 90.

If the determination at decision step 86 is negative, then control returns to decision step 86.

Otherwise, the current iteration has terminated. It will be understood that the solver may at any time independently complete its operation and terminate the iteration based on internal termination criteria. This is shown for purpose of exposition as decision step 92, with control returning to decision step 86 if the solver is still in operation.

When the iteration terminates, at step 88, if an improvement achieved then the .mst file is stored, and the non-improvement counter is reset to 0. If no improvement has been achieved, the .mst file is not stored, and the non-improvement counter is incremented by 1.

Next, at step 94, parameters are initialized for the next iteration. A new fixing mode, if applicable, is determined using the algorithm of Listing 1. The fixing fraction is adjusted, using the rules presented in Table 1. A new iteration time limit is computed based on the adjusted fixing fraction, using the equation:

New time limit=Fixing type time limit*Initial fixing fraction/Current fixing fraction.

Next, in step 96, values are assigned to a randomly chosen set of skeleton variables to the values they assumed in the previous iteration. This is done in the same manner as in step 58 (FIG. 5).

Control now returns to step 82 where the .MST file is read in, and the new version resubmitted to the solver in another iteration of step 84. Of course, if a global session termination criterion has been met, for example expiration of the global time limit, the session terminates.

Performance Data.

Table 2 presents a comparison between the performance of the cruncher 20 (FIG. 2) and the above-noted Cplex solver, when applied to several benchmark problems in optimization. In four of the five problems, the time required for the inventive arrangement to reach a solution was far less than that of the unaided Cplex product. Only in the vessel load planning problem did the performance of Cplex surpass that of the Cruncher-enabled system 10 (FIG. 1).

TABLE 2

| Problem | Problem Size | Cplex Results | Cruncher Results |
|---|---|---|---|
| Flow Shop | 10 Jobs, 10 tasks per job, 10 machines 1002 Vars, 1451 Rows 3803 non-zero elements | Objective: 951 Time: 17406 sec. | Objective: 943 Time: 137 sec. |
| Traveling Salesman | 97 Points 9218 Vars, 9313 Rows 54722 non-zero elements | Objective: 577 Time: 1239 sec. | Objective: 519 Time: 499 sec. |
| Class Assignments | 310 students, 7 classes 8691 Vars, 5245 Rows 46558 non-zero elements | Obj: 240000, 2000 Sec. Obj: 20000, 6200 Sec. | Objective: 20000 Time: 376 sec. |
| Vessel Load Planning | 1825 containers, 10 destinations, 3 ports look ahead 13050 Vars, 10166 Rows 82506 non-zero elements | 1000 sec. Obj. = 131936 2000 sec. Obj. = 7445 3000 sec. Obj. = 181 4000 sec. Obj. = 172 | 1000 sec. Obj. = 3387 2000 sec. Obj. = 845 3000 sec. Obj. = 634 4000 sec. Obj. = 578 |

TABLE 2-continued

| Problem | Problem Size | Cplex Results | Cruncher Results |
|---|---|---|---|
| Scheduling | 14 items 7500 slots 92787 Vars, 168950 Rows 594897 non-zero elements | Objective: 90 Time: 2000 sec. | Objective: 70 Time: 220 sec. |

Table 3 is similar to Table 2 and presents a comparison between the performance of the cruncher 20 (FIG. 2) and the Cplex solver, when applied to several benchmark problems suitable for commercial solvers. The problems were selected from a library maintained by Konrad-Zuse-Zentrum für Informationstechnik Berlin (ZIB), available on the Internet.

TABLE 3

| Problem | Cplex Results | Cruncher Results |
|---|---|---|
| LIU | Objective: 1198 Time: 1800 sec. | Objective: 1124 Time: 1800 sec. |
| DS | Objective: 352 Time: 23600 sec. | Objective: 232 Time: 3600 sec. |
| DANO3 | Objective: 717 Time: 1800 sec. | Objective: 689 Time: 1800 sec. |
| T1717 | Objective: 275334 Time: 1800 sec. | Objective: 218056 Time: 1800 sec. |

Reference is now made to FIG. 12, which is a table showing the output of a typical session of the cruncher 20 (FIG. 2). In this display the column headed "ReleaseFrac" is the quantity 1−Fixing Fraction. The column entitled "Value" is the value of the objective function for the particular problem, which improves progressively from the first to the last row of the table.

Example 1

In this example, a comparison is made between the Cplex solver applied to the class assignments problem of Table 2, the Cplex solver in conjunction with the cruncher 20 (FIG. 2) in fix-to-zero mode, and in fix-to-value mode. In the latter two cases, the starting point is the best solution obtainable with the Cplex solver alone.

Reference is now made to FIG. 7, which is a screen display illustrating a monitor output of the operation of the Cplex solver applied to the class assignments problem without aid of the cruncher 20. In the screen display, the best result is stored in the fourth column from the left. An objective function value of 40450 was obtained after 1817 seconds of operation.

Reference is now made to FIG. 8, which is a screen display similar to FIG. 7, illustrating a second phase in which the cruncher 20 was used in conjunction with the Cplex solver, beginning with the initial solution obtained in FIG. 7, using a fix-to-value mode and a fixing fraction of 0.9. The objective function was reduced from 40450 to 28600 in 10 seconds.

Reference is now made to FIG. 9, which is a screen display similar to FIG. 7, illustrating a second phase in which the cruncher 20 was used in conjunction with the Cplex solver, beginning with the initial solution obtained in FIG. 7, using a fix-to-value mode and a fixing fraction of 0.9. The objective function was reduced from 28600 to 22300 in 0.28 seconds of operation.

By continuing the operation, it was possible to reduce the value of the objective function to 1550 in about 15 minutes, using the fix-to-value mode.

The following exemplary problems are readily solved by application of the principles of the invention, e.g., by the system 10 (FIG. 1).

Example 2

Vessel Load Planning

Input:
Containers (Id number, Weight, Size, POL (Port of Loading), POD (Port of Destination))
Vessel Slots (Slot_Id, Slot location (Bay, Row, Tier, Upper/Lower deck)
Vessel initial cargo (Slot Id, Container Id)
Loading forecast for the next three ports (Port, POD, Size, Number of containers).
Number of cranes in the next three ports (Port, Number of cranes).
Hazardous materials (Container id, hazardous material type).
Output: Slot Assignment: (Container Id, Slot Id).
Objective: The desired solution is an optimum vessel loading plan.
Parameters of a "good" vessel loading plan:
Minimal number of re-stow operation.
Vessel balance and low center of gravity
Grouping of containers to be discharged according to crane configuration.
Respect for all the special loading rules such as hazardous material separation.

Figure 10:
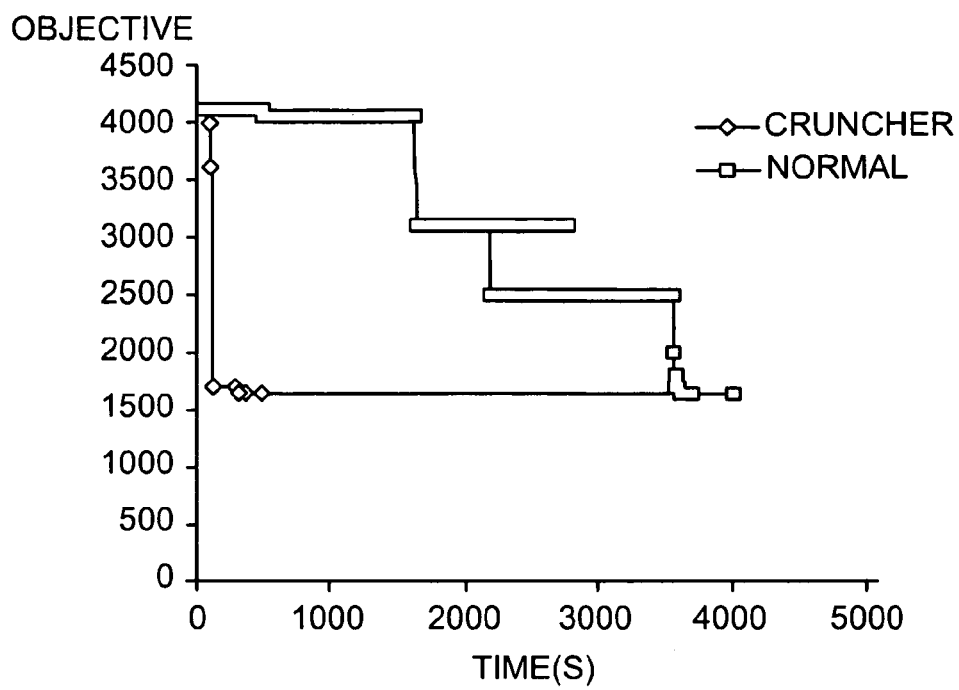
FIG. 10 is a performance graph illustrating the unaided operation of the unaided commercial solver compared to the use of the commercial solver when applied to a vessel loading problem in accordance with a disclosed embodiment of the invention.

Reference is now made to FIG. 10, which is a graph illustrating the unaided operation of the Cplex solver compared to the Cplex solver aided by the cruncher 20 (FIG. 1) when applied to the vessel load planning problem. In this example both operations attain an objective function value of about 1600. However the cruncher 20 enables this result to be obtained in about 100 time units, and the unaided Cplex solver requires more than 3500 time units.

Example 3

Student to Class Assignment

Input:
Classes (Class1, Class2, Class3, Class4, Class5)
Balancing Criteria (like gender, learning capability, address, previous school, cognitive problems, emotional problems, general behavior etc.)
Students (Name, Id number, value for each criterion)
Not both in the same class (Student 1, Student 2)
Preferred friends (Student, Friend1, Friend2, Friend3)
Output: Student-Class assignments (Student Id, Class Id)
Objective: a gender balance in each class within a predefined range, optimally 50% for each gender.

Figure 11:
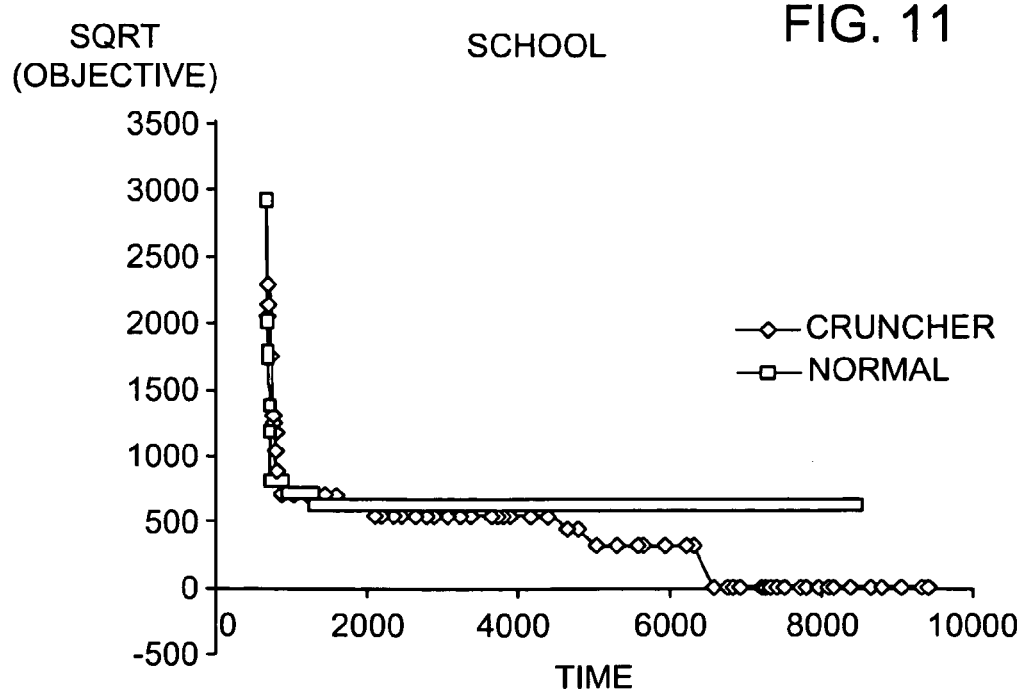
FIG. 11 is a performance graph illustrating the unaided operation of the unaided commercial solver compared to the use of the commercial solver when applied to a school class assignment problem in accordance with a disclosed embodiment of the invention.

Reference is now made to FIG. 11, which is a graph similar to FIG. 10, applied to the Student-Class assignment problem. In this problem initial convergence to a suboptimum value is seen in both modes of operation. Here, however, the cruncher 20 significantly improves the best value obtainable with the unaided Cplex solver.

Example 4

Project Scheduling

Input:
Time Intervals (1, 2, 3, . . . )
Projects (Project Id, Start interval, End interval)
Tasks (Task id, Task Name, project id, length, deadline interval)
Skills (Skill Id, Skill Description)
Skill Levels (Skill Id, Level Id)
Jobs (Job Id, Job Description, Task Id, Capacity)
Task Precedence (Task1, Task2) (Task1 should be completed before task2 starts)
Employee (Id, Name, Capacity)
Employee Skills (Employee Id, Skill, Skill Level)
Output:
Employee to job assignment (Employee Id, Job Id)
Task to time interval assignment (Task Id, Start Interval)
Objective: Assigning the most fit people to jobs. Meeting the project and task deadlines.

Example 5

Flow Shop Scheduling

Input:
Time Intervals (1, 2, 3, . . . )
Machine (Machine Id) (A machine can process one job at a time)
Tasks.
Jobs (Job Id, Task Id, Order in Task, Length, Machine Id)
Output:
Job Scheduling (Job Id, Start Interval)
Objective: Minimize completion time for all jobs.

Example 6

School Time Table Generation

Input:
Classes
Courses per class.
Teachers.
Teacher availability throughout the week, expressed in days of the week, and hours within the days.
Pedagogical rules: For example, some courses should have two consecutive hours. Other courses should not be given in successive days. Difficult material should be taught in morning hours.
Output:
Day and hour for each course.
Objective: Minimize rule violations

Example 7

Rehearsal Scheduling in a Backup Center

There is a backup facility with a limited amount of physical resources (Servers). Due to virtualization capabilities, customer servers can be mapped into the physical servers of the center. The rehearsals are meant to simulate a crisis scenario in which all the computing center of a customer will migrate to the backup center. Rehearsal times must be coordinated so that not too many customers will be scheduled to the same time resulting in shortage of physical resources. Scheduling the rehearsals must take the customers requirements concerning convenient time periods and volume of computing power to be mapped. The computer resources are drilled down into CPU, Disk space, internal memory space and communication bandwidth.

Input:

Customer rehearsal events where each event contains server requests and each server request consists of CPU, disk, memory and communication band requirements.

Customer sharing options with other customers.

Customers preferred time windows for the rehearsals.

Backup center physical servers' capacity (CPU, disk, memory and communication).

Output:

Schedule of customer events in day and hour resolution.

Mapping of customer machine into physical servers of the backup center.

Example 8

Traveling Salesman Problem

Input

A set of geographical points that have to be visited by the travelling salesman.

The distance between every pair of points.

Output:

A closed tour through all the points that minimizes the total travel distance.

Objective: Minimize total distance traveled.

Other Applications.

Other representative optimization problems to which the principles of the present invention can be applied include:

Vehicle routing problems.

Shift workers scheduling in call centers.

Scheduling aircraft engine maintenance in airline companies.

Determining graph connectivity.

Printed circuits placement problems.

Alternate Embodiment 1

Reference is now made to FIG. 13, which is a detailed block diagram of the program and data objects that are incorporated in the memory 12 of the system 10 (FIG. 1) in accordance with an alternate embodiment of the invention. The cruncher 20 and solver 26 are now integral within an augmented solver module 98. Integrating the code of the cruncher 20 and the solver 26 enhances the speed of computation, particularly in hardware implementations, where issues such as bus contention and propagation delays due to distance are mitigated.

As will be appreciated by one skilled in the art, the present invention may be embodied as a system, method or computer program product. Accordingly, the present invention may take the form of an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flow-chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flowchart and/or block diagram block or blocks.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. An optimization method for problem solving comprising:
   with a processor and a memory in which computer program instructions are stored, wherein the instructions comprise distinct software modules, the software modules comprising a cruncher module and a solver module, the processor operative under control of the instructions to perform the steps of:
   accepting a model of a problem to be solved, the model being formatted in a mixed integer programming format and being constrained within a space of valid solutions by a plurality of variables, the variables comprising integer variables and non-integer variables;
   with the cruncher module accepting a definition of an objective function to evaluate a solution of the problem;
   generating an initial solution for a version of the problem;
   designating a set of the integer variables as skeleton variables that are eligible for fixed value assignments;
   choosing a fixing fraction as a proportion of the skeleton variables to be selected;
   randomly selecting a subset of the skeleton variables, a size of the subset being the fixing fraction of the skeleton variables;
   constraining the space of the valid solutions to a non-empty subspace of the valid solutions by assigning fixed values to members of the subset according to respective values thereof that were determined in a previous solution of the problem, to thereby define a new version of the problem; and
   submitting the new version of the problem to the solver module, the solver module being operative for automatically solving the new version of the problem by finding values of the integer variables that correspond to an extremum of the objective function within the subspace of the valid solutions to obtain a solution of the new version, the solution having an objective value;
   making a comparison of the objective value of a current iteration with the objective value of a previous iteration;
   responsively to the comparison choosing a new fixing fraction;
   iterating the steps of randomly selecting, constraining, submitting, making a comparison and choosing a new fixing fraction, using the new fixing fraction as the fixing fraction until a termination criterion is satisfied; and
   thereafter reporting an optimum solution to the problem.

2. The method according to claim 1, wherein preparing the model comprises receiving signals indicative of physical conditions of a subject of the problem and incorporating data of the physical conditions in the model.

3. The method according to claim 1, wherein choosing a new fixing fraction is performed by increasing a value of the fixing fraction when the objective value of the current iteration indicates lack of improvement over the objective value of the previous iteration and a predetermined time limit has expired, and decreasing the value of the fixing fraction when the objective value of the current iteration indicates lack of improvement over the objective value of the previous iteration and a criterion of optimality has been satisfied.

4. The method according to claim 1, further comprising the step of detecting that a dive-triggering criterion was satisfied in a previous performance of solving the new version, and responsively thereto toggling a fixing mode for assigning fixed values to the subset of the skeleton variables between a fix-to-zero mode, wherein the members are assigned a value of zero and a fix-to-value mode, wherein the members are respectively assigned previous values thereof, the previous values being obtained from a previous performance of automatically solving the new version.

5. The method according to claim 1, wherein the instructions further comprise a model builder for assisting a human operator in preparing the model of the problem to be solved.

6. A method for configuring a computer-readable medium comprising:
   forming transitions in a non-transitory tangible computer-readable medium, the transitions comprising digital patterns that are interpretable by a computer as instructions, wherein the instructions comprise distinct software modules, the software modules including a cruncher module and a solver module, which instructions, when executed by the computer, cause the computer to perform the steps of:
   accepting a model of a problem to be solved, the model being formatted in a mixed integer programming format and being constrained within a space of valid solutions by a plurality of variables, the variables comprising integer variables and non-integer variables;
   with the cruncher module accepting a definition of an objective function to evaluate a solution of the problem;
   generating an initial solution for a version of the problem;
   designating a set of the integer variables as skeleton variables that are eligible for fixed value assignments;
   choosing a fixing fraction as a proportion of the skeleton variables to be selected;
   randomly selecting a subset of the skeleton variables, a size of the subset being the fixing fraction of the skeleton variables;
   constraining the space of the valid solutions to a non-empty subspace of the valid solutions by assigning fixed values to members of the subset according to respective values thereof that were determined in a previous solution of the problem, to thereby define a new version of the problem; and
   submitting the new version of the problem to the solver module, the solver module being operative for automatically solving the new version of the problem by finding values of the integer variables that correspond to an extremum of the objective function within the subspace of the valid solutions to obtain a solution of the new version, the solution having an objective value;
   making a comparison of the objective value of a current iteration with the objective value of a previous iteration;
   responsively to the comparison choosing a new fixing fraction;
   iterating the steps of randomly selecting, constraining, submitting, making a comparison and choosing a new fixing fraction, using the new fixing fraction as the fixing fraction until a termination criterion is satisfied; and thereafter reporting an optimum solution to the problem.

7. The method according to claim 6, wherein preparing the model comprises receiving signals indicative of physical conditions of a subject of the problem and incorporating data of the physical conditions in the model.

8. The method according to claim 6, wherein choosing a new fixing fraction comprises:

detecting that a triggering criterion was satisfied in a previous performance of solving the new version, and responsively thereto varying the proportion of the skeleton variables to be selected in a subsequent performance of selecting a subset.

9. The method according to claim 6, further comprising the step of choosing a new fixing fraction is performed by increasing a value of the fixing fraction when the objective value of the current iteration indicates lack of improvement over the objective value of the previous iteration and a predetermined time limit has expired, and decreasing the value of the fixing fraction when the objective value of the current iteration indicates lack of improvement over the objective value of the previous iteration and a criterion of optimality has been satisfied.

10. A computer software product for solving an optimization problem, including:

a non-transitory computer storage medium in which computer program instructions are stored, wherein the instructions comprise distinct modules that include a model builder, a mixed integer programming solver module, and a cruncher module, which instructions, when executed by a computer, cause the computer to perform the steps of:

cooperatively with the model builder preparing a model of a problem to be solved, the model being formatted in a mixed integer programming format and being constrained within a space of valid solutions by a plurality of variables, the variables comprising integer variables and non-integer variables;

with the cruncher module accepting a definition of an objective function to evaluate a solution of the problem;

generating an initial solution for a version of the problem;

designating a set of the integer variables as skeleton variables for fixed value assignments; and choosing a fixing fraction as a proportion of the skeleton variables to be selected;

randomly selecting a subset of the skeleton variables, a size of the subset being the fixing fraction of the skeleton variables;

constraining the space of the valid solutions to a non-empty subspace of the valid solutions by assigning fixed values to members of the subset according to respective values thereof that were determined in a previous solution of the problem, to thereby define a new version of the problem; and submitting the new version of the problem to the solver module, the solver module being operative for automatically solving the new version of the problem by finding values of the integer variables that correspond to an extremum of the objective function within the subspace of the valid solutions to obtain a solution of the new version, the solution having an objective value;

making a comparison of the objective value of a current iteration with the objective value of a previous iteration;

responsively to the comparison choosing a new fixing fraction;

iterating the steps of randomly selecting, constraining, submitting, making a comparison and choosing a new fixing fraction, using the new fixing fraction as the fixing fraction until a termination criterion is satisfied; and thereafter reporting an optimum solution to the problem.

11. The computer software product according to claim 10, wherein preparing the model comprises receiving signals indicative of physical conditions of a subject of the problem and incorporating data of the physical conditions in the model.

12. The computer software product according to claim 10, wherein choosing a new fixing fraction is performed by increasing a value of the fixing fraction when the objective value of the current iteration indicates lack of improvement over the objective value of the previous iteration and a predetermined time limit has expired, and decreasing the value of the fixing fraction when the objective value of the current iteration indicates lack of improvement over the objective value of the previous iteration and a criterion of optimality has been satisfied.

13. The computer software product according to claim 10, wherein the instructions cause the computer to perform the additional step of detecting that a dive-triggering criterion was satisfied in a previous performance of solving the new version, and responsively thereto toggling a fixing mode for assigning fixed values to the subset of the skeleton variables between a fix-to-zero mode, wherein the members are assigned a value of zero and a fix-to-value mode, wherein the members are respectively assigned previous values thereof, the previous values being obtained from a previous performance of automatically solving the new version.

14. The computer software product according to claim 10, wherein generating an initial solution comprises setting a the proportion of the set of the integer variables to zero.

15. A data processing system for solving an optimization problem, comprising:

a processor;

a memory accessible to the processor storing programs and data objects therein, wherein execution of the programs cause the processor to perform the steps of:

preparing a model of a problem to be solved, the model being formatted in a mixed integer programming format and being constrained within a space of valid solutions by a plurality of variables, the variables comprising integer variables and non-integer variables;

defining an objective function to evaluate a solution of the problem;

generating an initial solution for a version of the problem;

designating a set of the integer variables as eligible integer skeleton variables for fixed value assignments; and choosing a fixing fraction as a proportion of the skeleton variables to be selected;

randomly selecting a subset of the skeleton variables, a size of the subset being the fixing fraction of the skeleton variables;

constraining the space of valid solutions to a non-empty subspace of valid solutions by assigning fixed values to members of the subset according to respective values thereof that were determined in a previous solution of the problem, to thereby define a new version of the problem, wherein the members of the subset are ineligible for subsequent fixed value assignments; and automatically solving the new version of the problem by finding values of the integer variables that correspond to an extremum of the objective function within the subspace of valid solutions to obtain a solution of the new version, the solution having an objective value;

making a comparison of the objective value of a current iteration with the objective value of a previous iteration;

responsively to the comparison choosing a new fixing fraction;

iterating the steps of randomly selecting, constraining, solving the new version, making a comparison and choosing a new fixing fraction, using the new fixing fraction as the fixing fraction until a termination criterion is satisfied, wherein the programs include:

a model builder for preparing the model of the problem to be solved;

a mixed integer programming solver module for solving the new version of the problem;

a cruncher module that iteratively submits the new version of the problem to the solver module; and a monitoring module that exercises supervisory control over the cruncher module.

16. The data processing system according to claim 15, wherein choosing a new fixing fraction is performed by increasing a value of the fixing fraction when the objective value of the current iteration indicates lack of improvement over the objective value of the previous iteration and a predetermined time limit has expired, and decreasing the value of the fixing fraction when the objective value of the current iteration indicates lack of improvement over the objective value of the previous iteration and a criterion of optimality has been satisfied.

* * * * *